(No Model.)  2 Sheets—Sheet 1.

J. F. SULLIVAN.
TRIPOD.

No. 600,654. Patented Mar. 15, 1898.

WITNESSES:
Chas. H. Luther Jr
B. M. Simms

INVENTOR:
John F. Sullivan
By Joseph A. Miller & Co.
Attys.

THE NORRIS PETERS CO., PHOTO-LITHO., WASHINGTON, D. C.

(No Model.) 2 Sheets—Sheet 2.
J. F. SULLIVAN.
TRIPOD.
No. 600,654. Patented Mar. 15, 1898.
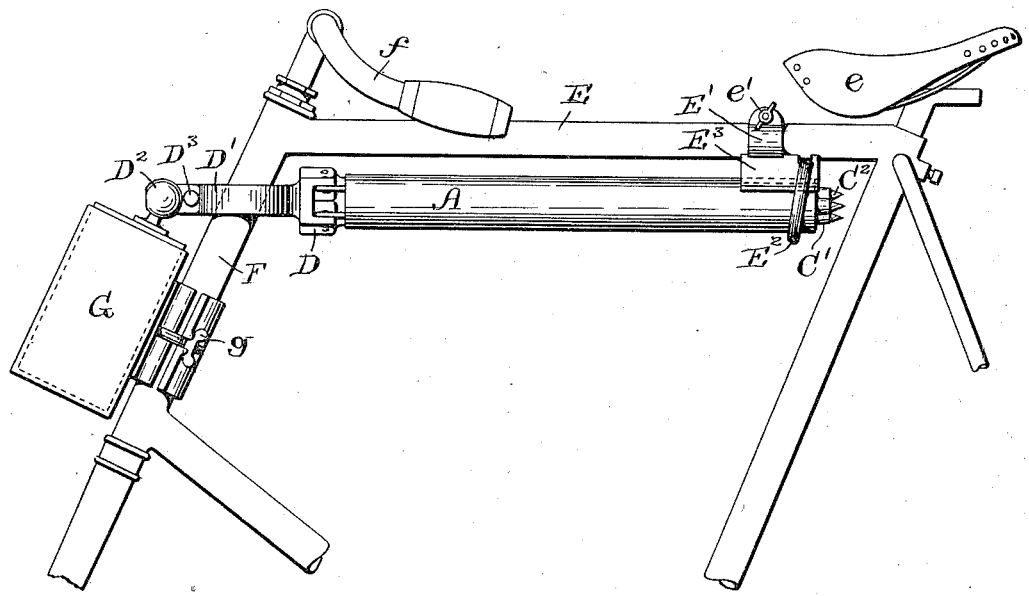
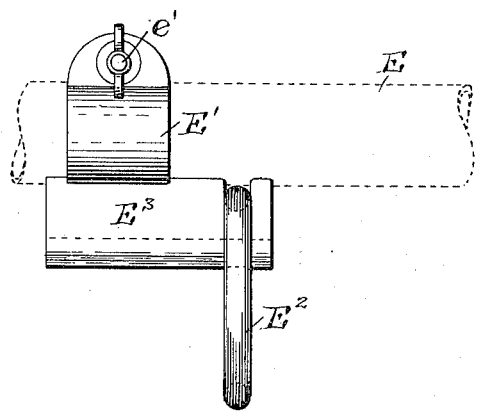
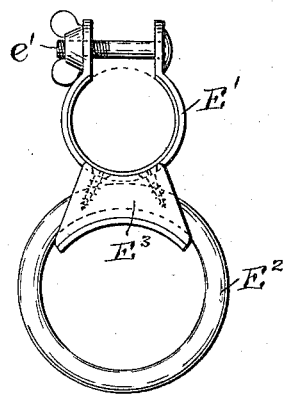
WITNESSES:
Chas. H. Luther Jr
O. M. Simms
INVENTOR:
John F. Sullivan
Joseph A. Miller & Co.
Attys.

Wri# UNITED STATES PATENT OFFICE.

JOHN F. SULLIVAN, OF PROVIDENCE, RHODE ISLAND, ASSIGNOR TO STOCKFORD WHEATON, JR., OF SAME PLACE.

TRIPOD.

SPECIFICATION forming part of Letters Patent No. 600,654, dated March 15, 1898.

Application filed July 23, 1897. Serial No. 645,676. (No model.)

*To all whom it may concern:*

Be it known that I, JOHN F. SULLIVAN, of Providence, in the county of Providence and State of Rhode Island, have invented a new and useful Improvement in Tripods; and I hereby declare that the following is a full, clear, and exact description of the same, reference being had to the accompanying drawings, forming part of this specification.

This invention has reference to an improvement in collapsible tripods, such as are used for the support of a compass, theodolite, camera, or other instrument; and it consists in the peculiar and novel construction of the legs and the supporting-stand for the instrument, as will be more fully set forth hereinafter.

The object of the invention is to secure great strength and rigidity combined with lightness.

Another object of the invention is to adapt the tripod for convenient transportation on a bicycle; and another object of the invention is to provide convenient attachments to a bicycle for carrying the instrument and the tripod.

Figure 1:
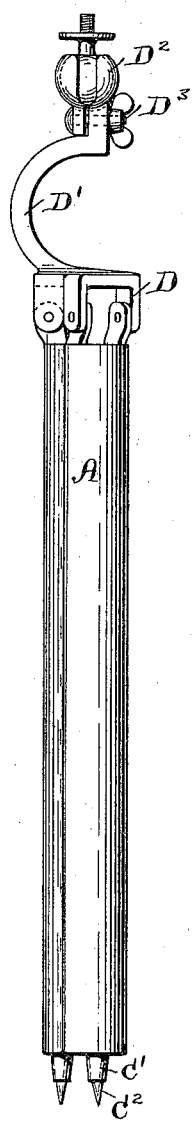
Figure 2:
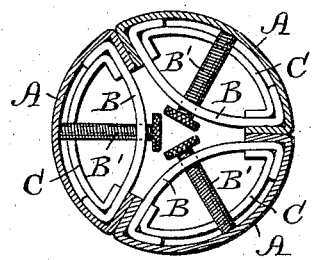
Figure 3:
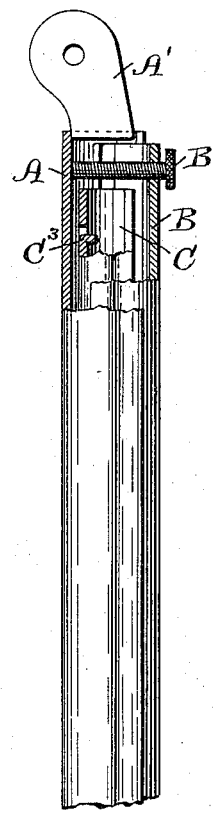
Figure 4:
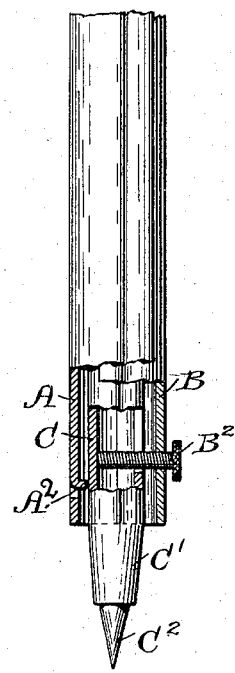

Figure 1 is a side view of the tripod, showing the same in its contracted form. Fig. 2 is a transverse section of the contracted three legs of the tripod. Fig. 3 is an enlarged side view, partly in section, of the upper part of one of the three legs of the tripod; and Fig. 4, a side view, partly in section, of the lower part of one of the three legs. Fig. 5 is a side view of part of a bicycle, showing the tripod and the instrument secured to the same. Fig. 6 is a side view, on an enlarged scale, showing a clamp and ring support for the tripod; and Fig. 7 is an end view of the clamp and ring support.

Similar marks of reference indicate corresponding parts in all the figures.

In the drawings, A indicates the outer and upper section of one of the three legs of the tripod, to which the pivot-brackets A' are secured; B, the inner section, and C the intermediate section, on the lower end of which the sockets C' are formed to support the points $C^2$. Each one of these three sections A, B, and C is made of a strip of light sheet metal—such as steel, bronze, brass, or other suitable metal. Where great lightness is desired aluminium may be used. The sheets or strips are bent to form a segmental section of a circle, and the edges of the strips are bent at a sharp angle to form a bearing on the adjoining sheet or strip, the whole forming an elliptic section of each leg, and the three legs, when folded, a cylindrical form. The three sections slide telescopically in each other. The inner section B is provided with two set-screws B' and $B^2$, having preferably milled heads. When the three sections are telescoped into each other, the set-screw B' is turned to bear against the surface of section A to hold the section B in this position and the set-screw $B^2$ is turned to bear on the section C to hold it in the shortened position. When the legs are to be extended, the set-screws are loosened. The section C is drawn out until the stop $C^3$, which is made by punching a portion of the sheet metal inward, rests on the set-screw $B^2$. This set-screw is now turned to bear lightly on the section C and hold it in the extended position, and the inner section B is drawn out until the set-screw B' bears against the stop $A^2$, when the set-screw is turned to bear on the section A, and thus the extreme extension of the legs is secured. For less extensions the set-screws B' and $B^2$ may be secured at any intermediate point desired. By this construction a rigid and light tripod is secured, which occupies but a short length and is of a cylindrical form similar to the horizontal tube of the usual diamond frame of a bicycle. The legs are pivotally connected with the tripod-plate D, from which extends the curved bracket D', having at its upper end central over the tripod-plate D the ball-and-socket support $D^2$ for the instrument, provided with the clamp-screw $D^3$, by which the instrument may be secured when it is connected with the ball-and-socket support in any desired position within the capacity of the ball-and-socket support.

E indicates the horizontal reach or tube of a bicycle-frame; F, the steering-tube; $f$, the handle-bars, and $e$ the saddle of a bicycle of the common diamond-shaped frame.

In Fig. 5 the tripod is shown suspended below the tube or reach E on a line with the tube. In this position the tripod does not interfere with the rider in the least, and this position is made possible by the peculiar construction of the support for the instrument, the curved bracket $D^2$ extending around the steering-tube F.

G indicates the case of a camera or similar instrument connected with the ball-and-socket support $D^2$ of the tripod. The case G is secured to the steering-tube by the clamp $g$ of a construction similar to E'. (Shown in Fig. 7.) When not in use, the instrument is inserted into the case G without releasing it from the ball-and-socket support, and the end of the tripod is suspended by the ring $E^2$, connected with the bolster $E^3$, which is secured to the reach E of the bicycle-frame by the clamp E'. By loosening the fly-nut $e'$ the clamp E' may be shifted on the reach or tube E to securely hold or release the tripod.

A camera and tripod of this construction can be conveniently carried on a bicycle without any inconvenience to the rider and without injury to the instrument.

Having thus described my invention, I claim as new and desire to secure by Letters Patent—

1. A tripod the legs of which are made each of strips of sheet metal bent into the segmental curves described, the edges of the strips abruptly bent to form bearings for telescopically sliding the sections on each other, the three legs of the tripod, when closed, having the form of a cylinder, as described.

2. The combination with a tripod of the construction substantially as herein described, of the tripod-plate D, the curved bracket D' and the ball-and-socket support $D^2$, whereby the instrument is supported over the center of the tripod by a support on one side of the center, as described.

3. The combination with a bicycle-frame, of a tripod, of the construction substantially as described, provided with the curved bracket D' whereby the tripod may be secured to the bicycle and the curved bracket extend around a part of the bicycle-frame, as described.

4. The combination with the horizontal reach E and the steering-tube F of a bicycle, of the case G, the clamp $g$, the clamp E', and the tripod provided with the curved arm D and ball-and-socket clamp; whereby the instrument and tripod may be transported on the bicycle, as described.

In witness whereof I have hereunto set my hand.

JOHN F. SULLIVAN.

Witnesses:
JOSEPH A. MILLER, Jr.,
M. F. BLIGH.